Figure 1:
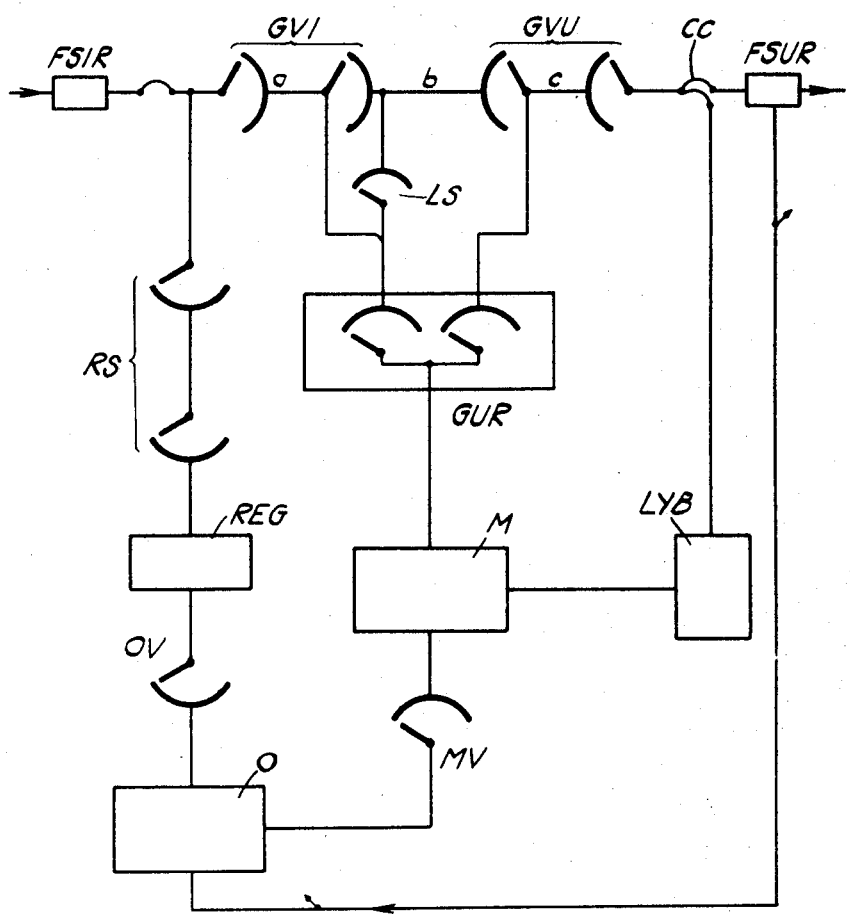

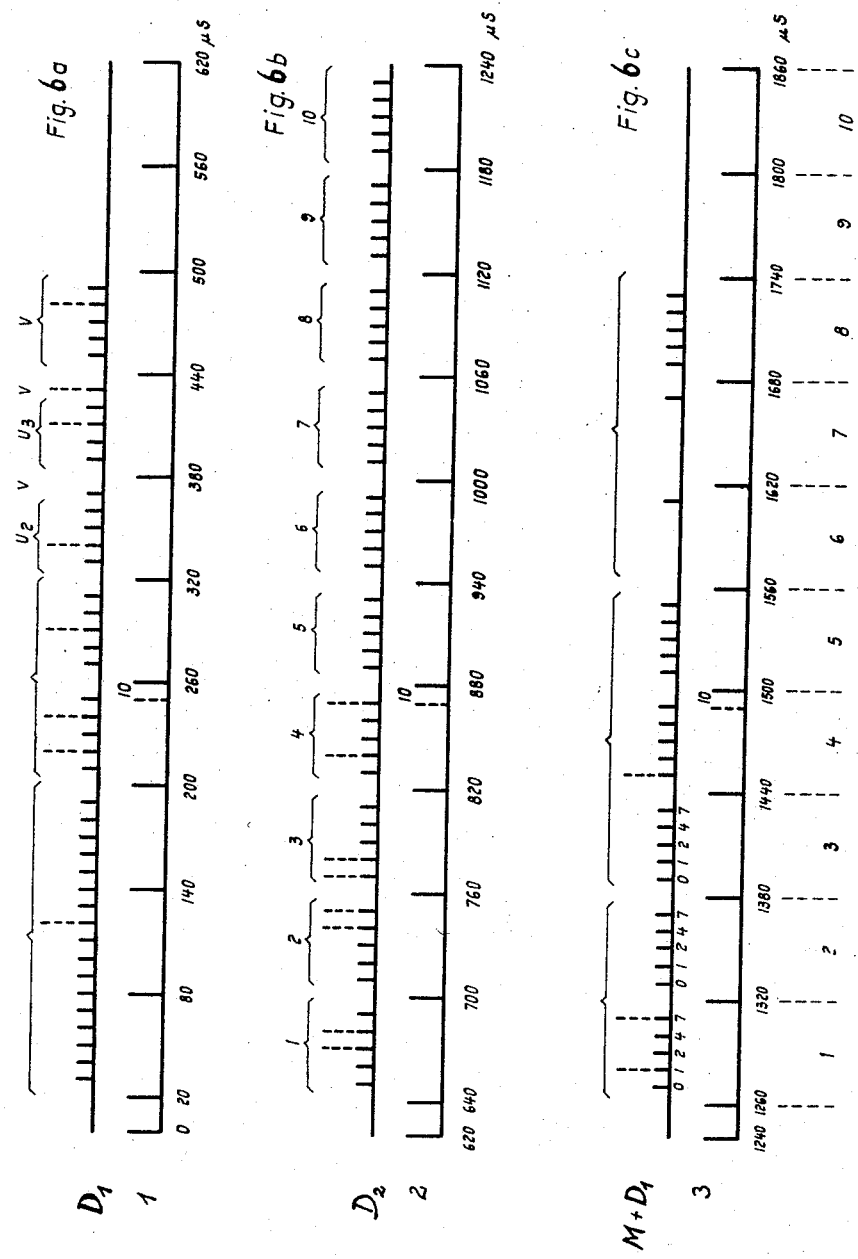

United States Patent Office 2,948,781
Patented Aug. 9, 1960

2,948,781
ELECTRONIC REGISTER
Gunnar Erik William Sparrendahl, Johanneshov, Sweden, assignor to Telefonaktiebolaget L M Ericsson, Stockholm, Sweden, a corporation of Sweden
Filed Aug. 27, 1956, Ser. No. 606,492
Claims priority, application Sweden Aug. 31, 1955
4 Claims. (Cl. 179—18)

The present invention refers to an electronic register comprised for example in automatic telephone exchanges.

The register is designed for co-operation with a translator mainly according to the same principle as in the system which is described in connection with the block diagram according to Fig. 1, but the memory of the register for the number of the called subscriber is designed in another way which also entails that the signal connection between the register and the translator is differently designed.

An embodiment of the register is described in connection with the attached drawings, Fig. 1 of which shows a block diagram over an automatic exchange, in which the electronic register according to the invention may be comprised, Figs. 2–5 show together a diagram for an embodiment of an electronic register which is made with logical symbols, Figs. 6a–6c show a time diagram of the signal connection between the register and the translator and Fig. 7 shows how Figs. 2–5 are to be arranged.

The memory of the register consists of an electroacoustic delay-line of magnetostrictive type known in itself. The number of the called subscriber circulates in the delay-line as pulses in two of five possible time positions for each digit, i.e. the value of the digit is determined by those of said time positions in which there are pulses. As is evident from Fig. 1, the transmission of the digits to the translator is effected by a translator selector OV with each digit in the form of pulses in two of five time positions instead of as pulses on two of five signal conductors as before. Synchronizing pulses from the register to the translator are suitably transmitted on a particular signal connection by the translator selector OV, said selector, thus, being a two-point selector.

The phase shift digit of the register according to the invention, i.e. the digit showing where the register is in the switching operation, consists of a pulse in for example one of seventeen time positions in a delay-line in the register. When the register changes the phase shift said delay-line is prolonged occasionally with a time position, and, therefore, the pulse at the next cycle in the delay-line is in a later time position.

In the following the switching operation of an electronic register according to the invention will be briefly described in connection with the attached drawings.

In said drawings certain symbols re-appear, and they are therefore described here at the beginning.

A common square ☐ indicates a bistable unit of some kind, for example a cold cathode tube, a transistor, etc., A square with a filled arrow →☐ indicates that a bistable unit is triggered and a square with a blank arrow ☐ that a bistable unit is re-set to the resting position;

There are semicircles D in different variations:
⇒)— =an and-circuit (having a voltage on both wires)
⇒)— =an inhibitor (having a voltage on the wire with the point marking which stops the passage of a voltage on the other wire),
⇒)— =an or-circuit (having a pulse on any one of the inputs which is passed to the output),
⇒)— =an or-circuit equal to a rectifier.

The circles designate:
Ⓜ =a monostable pulseshaper and
Ⓣ =a slow acting monostable pulseshaper.

As is shown in Fig. 1 calls are arriving from trunk lines having a trunk equipment FSIR, said calls causing a register finder RS to be set up. The register finder connects the trunk lines to an idle register. The register sends a signal to the calling station indicating that digit sending may begin. The register is calling translators after each received digit call by means of a translator selector OV. This selector can be an electronic selector. Only one pair of translators is required to perform the translations of about one hundred registers, as the busy time of the translator is only between three and four milliseconds. Each translator can be connected to an idle marker by a marker selector MV which is of the same kind as the translator selector. The number of markers M need not to exceed five even in the largest exchanges of this kind.

The signal conductors which are coming from the left end of the register diagram (Fig. 2) are according to Fig. 1 connected to the register finder RS. The signal connections $S_1$ and $S_2$ which come from the right end of the register diagram (Fig. 3) are connected to the translator selector OV (Fig. 1). The translator selector OV may according to the present invention suitably be provided with semiconductive diodes or semielectronic components.

Figure 2:
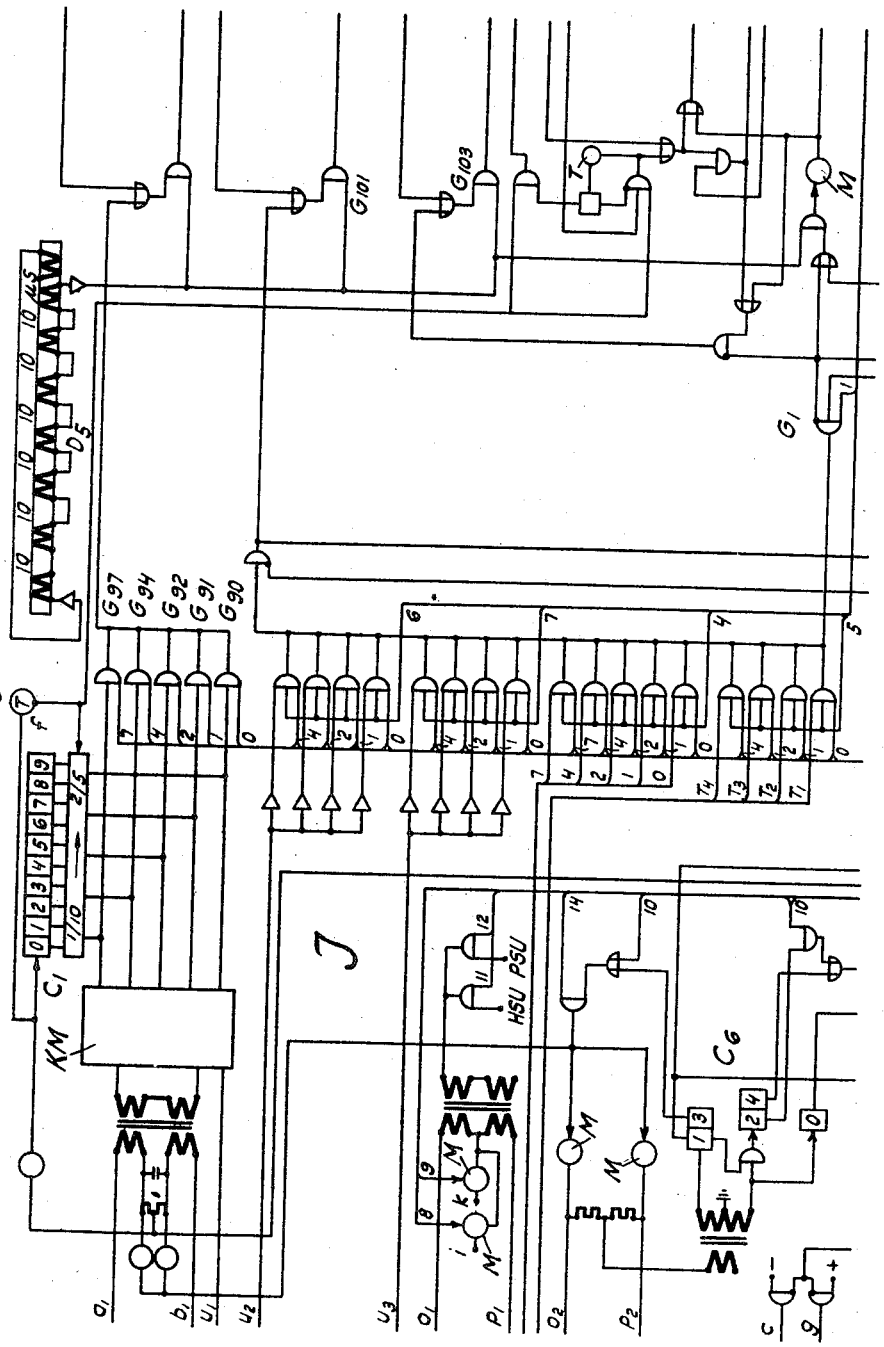
Figure 3:
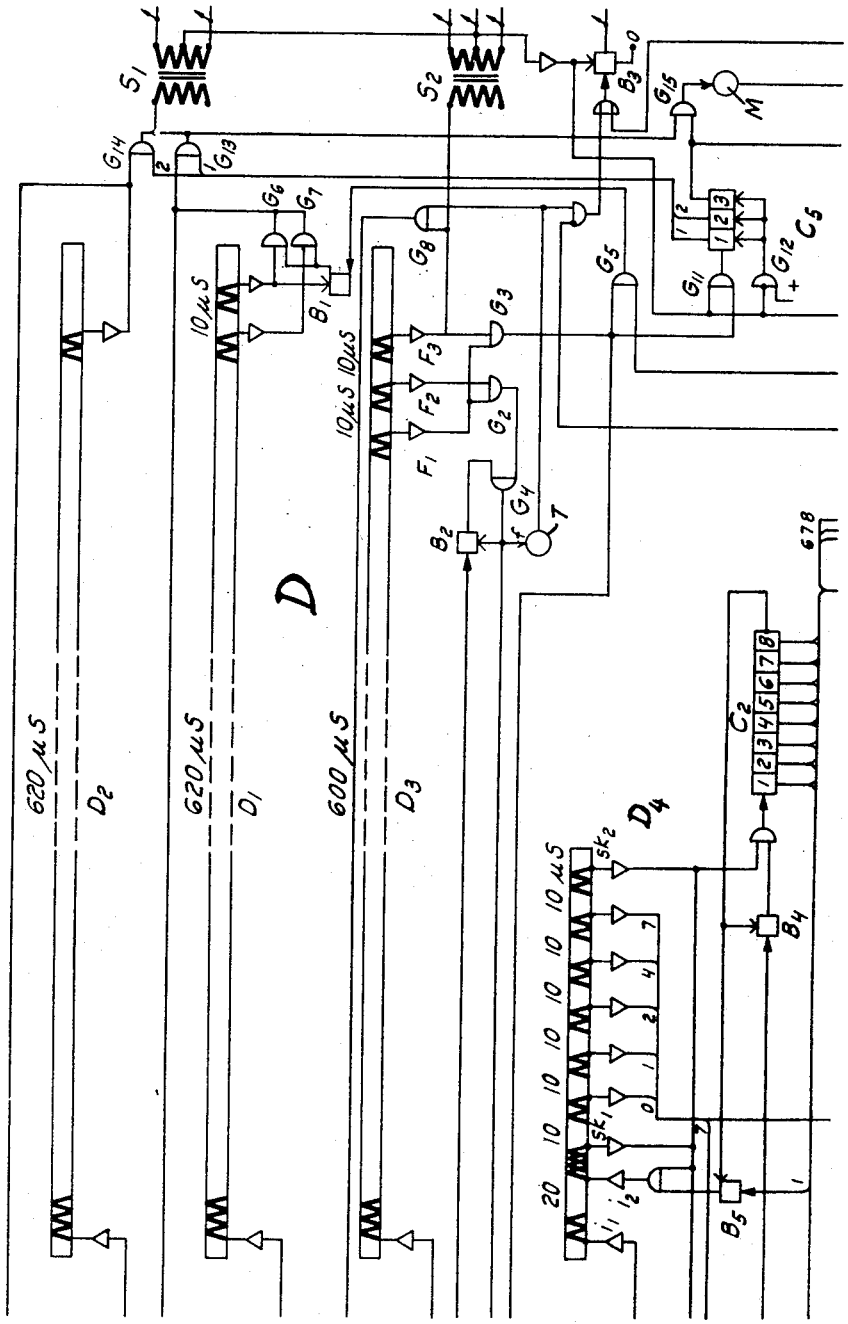
Figure 4:
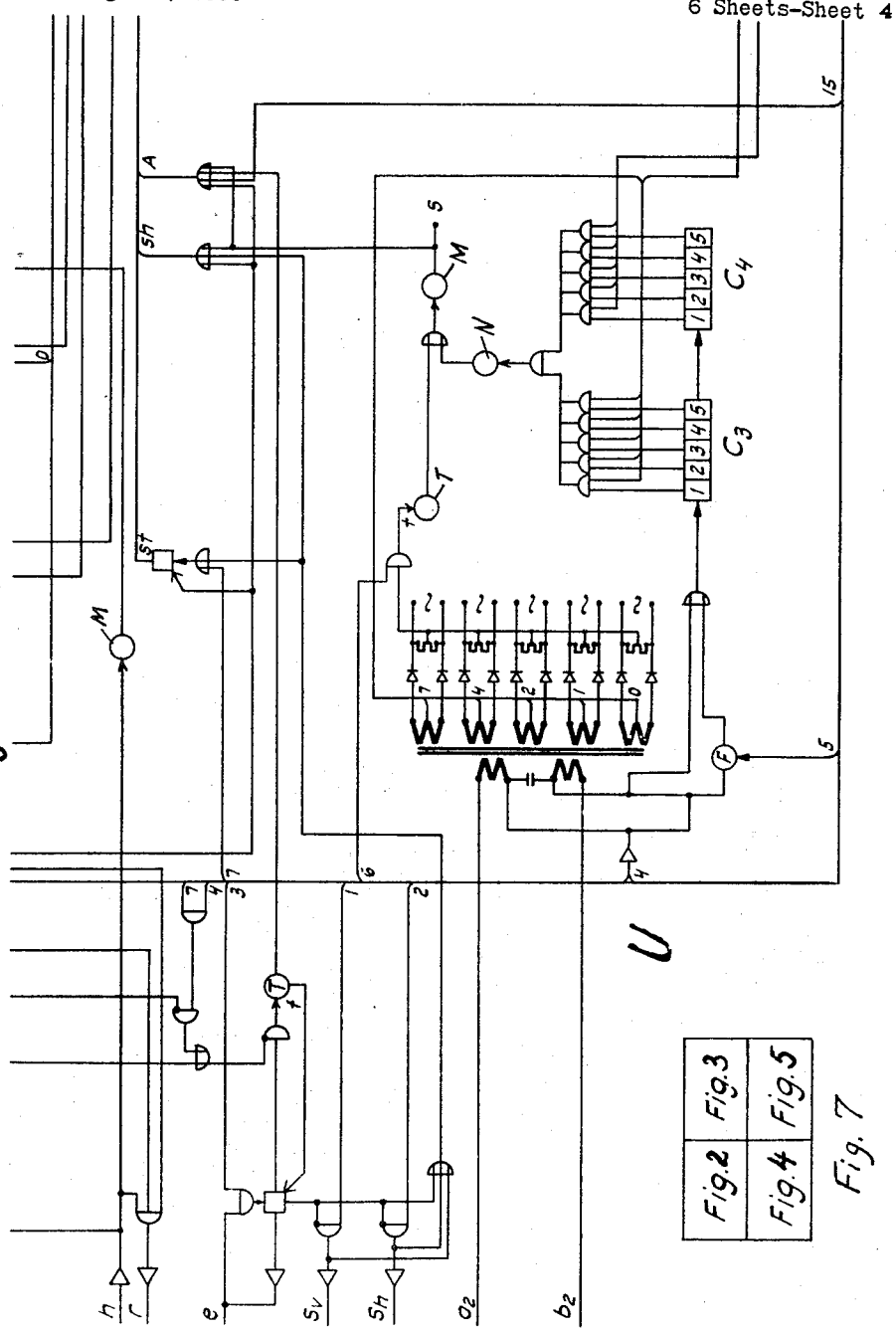
Figure 5:
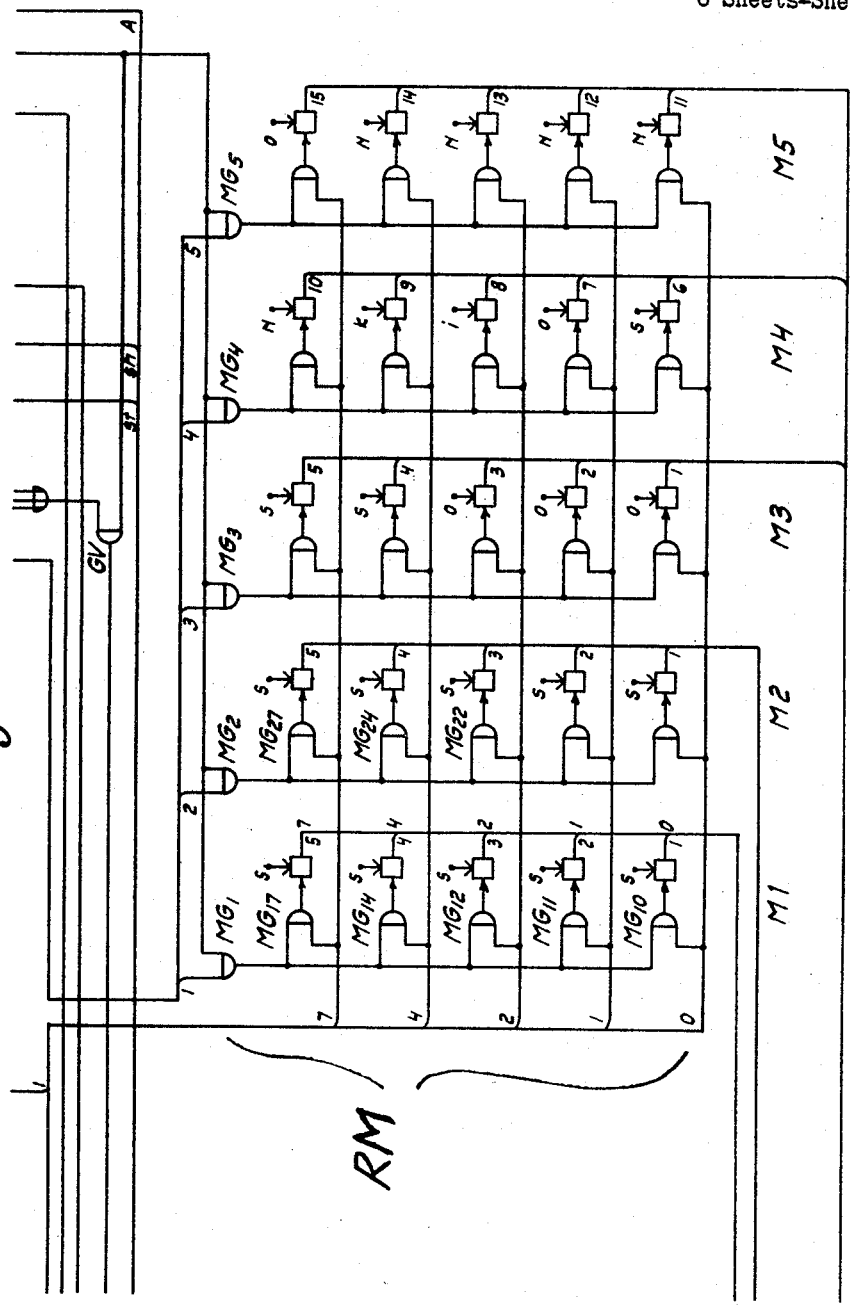

In the register according to Figs. 2–5 there is an input part I according to Fig. 2, a memory part D according to Fig. 3, a part M for receiving information from the translator according to Fig. 5 and an output part U for setting up the connection and sending digits to the address side according to Fig. 4.

The input part I generally consists of a code receiver KM for receiving the number of the address subscriber in the form of voice code impulses and a pulse counting chain $C_1$ for receiving the number of the address subscriber in the form of decade direct current impulses. A code translator device designated 1/10→2/5 is connected to said pulse counting chain $C_1$ for transmission of the digit from a marking on one of the ten outputs of the chain $C_1$ to markings on two of five wires. The devices (in Fig. 2 represented by amplifying symbols) which scent the original marking on the original wires $u_2$ and $u_3$ also belong to the input part.

The memory part D according to Fig. 3 consists of five magnetostrictive delay lines $D_1$–$D_5$ ($D_5$ in Fig. 2). In Figs. 6a–6c the signal connection between the register and the translator is shown and how the delay lines $D_1$ and $D_2$ are arranged. The delay time for each one of the delay lines $D_1$, $D_2$ and $D_3$ is 620 μs. according to the example in Figs. 6a–6c. This is the time necessary for a pulse to rotate once in the delay lines, when—as evident from Figs. 2–5—the pulses from the output of the delay lines are amplified and fed to the input of the same line. The delay time of 620 μs. is, except an interval of 20 μs., at the beginning of the time scale, divided into ten "frames" of 60 μs. each. These frames are parted by means of synchronizing pulses in the delay line $D_3$. As evident from Figs. 6a–6c there is in each "frame" room for pulses in five time positions with a distance of 10 μs. between each time position.

In the delay line $D_1$ the three first frames are used for marking the phase shift of the register. As evident from Fig. 6a there is space in these three frames for 17 positions for the phase shift pulse which is in Fig. 6a indicated as a dashed prolongation of one of the 17 short lines, which mark possible time positions. The frames 4 and 5 in the delay line $D_1$ are used for the unit- and the tens digit, respectively, of the input group selector unit GVi. The unit digit has the form of pulses in two of the five possible time positions, the tens digit having the form of a pulse in one of the five time positions.

In the frames 6 and 7 in the delay line $D_1$ the four first time positions of the original marking on the wires $U_2$ and $U_3$, respectively, are used. The fifth time position in the frames 6 and 7 and the frame 8 is used by the via-marking V received from the translator upon call of the translator of the markers.

The delay line $D_2$ according to Fig. 6b is used as a memory for the telephone number of the address subscriber. Each digit is registered as pulses in two of the five time positions in one of the ten frames.

The delay line $D_3$ according to Fig. 6c is used for the synchronizing pulses which separate the ten frames from each other. A statement is also received from the delay line $D_3$, when the time scale starts, and the number of registered digits in the delay line $D_2$ is also stated. As evident from Fig. 6 the beginning of the time scale is marked by two synchronizing pulses with an interval of 20 $\mu s$. only in the delay line $D_3$. As this is the only place on the time base where there are synchronizing pulses with an interval of 20 $\mu s$., the marking is univocal. Said marking causes the pulse amplifiers $F_1$ and $F_3$ to be operated at the same time, and, therefore, the and-circuit $G_3$ (in Fig. 3) opens. It is necessary to know, when the time scale begins both when a piece of information is transmitted to the translator and when the phase shift is changed.

When the change of the phase shift takes place, there is a voltage on the wire $sh$. When the and-circuit $G_3$ opens according to the above, which according to the time diagram takes place 20 $\mu s$. before the frame No. 1 begins (the location of the pick-up coils on the delay line $D_3$ according to Fig. 3), a voltage is received at the two inputs of the and-circuit $G_5$ which opens and triggers a bistable unit $B_1$. The unit $B_1$ causes the and-circuit $G_6$ to open and the inhibitor $G_7$ to close for pulses from the delay line $D_1$, and, therefore (as evident from Fig. 3), the delay line $D_1$ is now 10 $\mu s$. longer. The first pulse which is received from the delay line $D_1$ after the triggering of the unit $B_1$ is the pulse marking the phase shift. Said pulse resets the unit $B_1$, the delay line $D_1$ being reset to its original length of 620 $\mu s$. The change of the phase shift is now finished.

In which frame the digit received latest is located is marked by a pulse in the delay line $D_3$ 10 $\mu s$. before the synchronizing pulse marking the end of said frame. In the time diagram according to Fig. 6b four registered digits are shown as an example, said digits being registered in the delay line $D_2$, and, consequently, a (dashed) pulse is shown 10 $\mu s$. before the synchronizing pulse marking the end of the frame 4. As this is the only place on the time scale where pulses with an interval of 10 $\mu s$. only are to be found, the marking is univocal. The marking causes the amplifiers $F_1$ and $F_2$ (in Fig. 3) to be actuated at the same time and in consequence of this the and-circuit $G_2$ to open.

If a new digit is to be registered, the bistable unit $B_2$ is triggered. In this case the and-circuit $G_4$ opens, when the and-circuit $G_2$ opens. This is due to the location of the pick-up coils on the delay line $D_3$ (Fig. 3) 20 $\mu s$. before the end of the frame in which the digit received latest is registered. The opening of the and-circuit $G_4$ causes both the inhibitor $G_8$ to be locked during a certain time by means of a slow acting monostable circuit, and a pulse to be inserted over the input amplifier $i_1$ in the delay line $D_4$. The and-circuit $G_8$ causes the marking of the digit registered latest to be deleted from the frame in which it was located. The delay line $D_4$ causes instead said marking to be inserted in the next frame in the delay line $D_3$.

While the pulse passes along the delay line $D_4$, pulses are sent out by seventeen amplifiers with an interval of 10 $\mu s$. between the pulses. Synchronizing pulses are inserted in the delay line $D_3$ over the amplifiers $SK_1$ and $SK_2$.

In the stage of the switching operation which is now described, there are generally already synchronizing pulses in the delay line $D_3$, and, therefore, the insertion of new pulses does not have any effect. Pulses are sent out between the synchronizing pulses in the five time positions each on its wire, said wires being designated by 0, 1, 2, 4 and 7, respectively, in Fig. 3. The digit which is to be inserted in the delay line $D_2$ is to be found as a voltage on two of the five wires which come from the code receiver KM towards the right. The pulses from the delay line $D_4$ on the wires 0, 1, 2, 4, 7 cause the and-circuits $G_{90}$–$G_{97}$, respectively, to open with an interval of 10 $\mu s$. The received digit is, thus, transmitted in this way from a voltage on two of five wires of the code receiver KM to pulses in two of five time positions in the delay line $D_2$.

The delay line $D_5$ (in Fig. 2) is used for generating of the pulses which synchronize the three delay lines $D_1$, $D_2$ and $D_3$ mutually. The pulses circulating in these delay lines, have to pass the and-circuits $G_{101}$, $G_{102}$ and $G_{103}$, respectively, the other inputs of which are provided with pulses from the delay line $D_5$. The pulses from $D_5$ are received at an interval of 10 $\mu s$., as (as evident from Fig. 2) the pick-up coils are located at a distance of 10 $\mu s$. from each other on said delay line.

As all five delay lines are made of the same material the variation of the delay in relation to the temperature does not have any harmful influence.

The part M according to Fig. 5 for receiving the information from the translator consists of twenty-five bistable units (marked as squares). Ten of these units are used for indicating the value of the digit, which is to be sent by the register, and fifteen units are used for different instructions from the translator to the register. The translator sends, to the register, the value of the digit which is to be sent in the most suitable code with the present impulse method.

The part U according to Fig. 4 consists of circuits for the operation of the bar- and the operating magnets of the group selector GV1 (Fig. 1), circuits for the emission of digits in the form of voice codes or in the form of decade direct current impulse emission and circuits for the setting of 500-selectors upon traffic to the own local station. The pulse counting chains $C_3$ and $C_4$ count the emitted impulses at a decade impulse emission and the revertive impulses at the setting of 500-selectors. The chain $C_3$ proceeds one cycle, while the chain $C_4$ proceeds one step. When coincidence is obtained between the position of the chains $C_3$ and $C_4$ and the value of the digit which is registered in the M-part, the bistable units in M, which has registered the value of the digit, are reset to their resting positions. At the same time a pulse is sent over the wire $sh$ for the change of the phase shift, and the translator is re-called.

The signal connection with the translator will now be described in connection with Figs. 2–6c.

Upon call to the translator the bistable unit $B_3$ is triggered in the register (Fig. 3). A translator is thereafter connected to the calling register over the translator selector OV (Fig. 1) and connects voltage to the phantom circuit of the signal connection $S_2$ over the translator selector OV.

Said voltage causes the bistable unit $B_3$ to be reset and the and-circuit $G_{11}$ to be energized at one of the inputs. When the and-circuit $G_3$ opens, as described above, 20 $\mu s$. before the synchronizing pulse, at the beginning of the frame No. 1, has reached the terminal amplifier $F_3$ in the delay line $D_3$, a voltage is received at the two inputs of the and-circuit $G_{11}$, and, therefore, said and-circuit opens and causes the pulse counting chain $C_5$ to be put into the position 1. When the chain $G_5$ is in the position 1, the and-circuit $G_{13}$ is open for pulses from the delay line $D_1$. All information in the delay line $D_1$ is now transmitted to the translator over the signal connection $S_1$ by the translator selector OV in the consequence evident from Fig. 6a at the same time as said pulses circulate once in the delay line in the register.

When the marking in the delay line $D_3$ at the beginning of the time scale, i.e. two synchronizing pulses with a distance of 20 $\mu s.$, returns to the end of the delay line, the and-ircuits $G_3$ and $G_{11}$ open again, and the pulse counting chain $C_5$ advances to the position 2.

When the chain $C_5$ is in the position 2, the and-circuit $G_{14}$ is open and $G_{13}$ is closed, and, therefore, the information in the delay line $D_2$ is now transmitted to the translator over the signal connection $S_1$ in th consequence which in Fig. 6b is designated by the cycle 2. At the same time as the digits are transmitted to the translator they circulate once in the delay line $D_2$ in the register.

During the whole time when the translator is busy, the synchronizing pulses from the delay line $D_3$ are, through the signal connection $S_2$, transmitted by the translator selector OV to the translator and said pulses synchronize the reception of the information in the translator and the emission of the information from the translator in cycle 3 according to Fig. 6c. Besides the synchronizing pulses, during the whole time, circulate in the delay line $D_3$.

When the marking of the beginning of the time scale returns to the end of the delay line $D_3$, the and-circuits $G_3$ and $G_{11}$ open again and, therefore, the pulse counting chain $C_5$ advances to the position 3. In the position 3 the and-circuits $G_{13}$ and $G_{14}$ are closed, but the and-circuit $G_{15}$ opens at the same time as (as evident from Fig. 3) a pulse is received from the input amplifier $i_1$ in the delay line $D_4$. At the same time the bistable unit $B_4$ is triggered. When the pulse in the delay line $D_4$ 20 $\mu s.$ thereafter causes a pulse in the output amplifier $SK_1$, a pulse is obtained in the pulse counting chain $C_2$ said pulse being in the position 1. The pulse in the delay line $D_4$ thereafter causes pulses in turn with an interval of 10 $\mu s.$ on the wires 0, 1, 2, 4, 7. When the pulse reaches the end point of the delay line $D_4$ a pulse is obtained from the output amplifier $SK_2$, said pulse both moving the pulse counting chain $C_2$ to the position 2 and causing the insertion of a pulse over the input amplifier $i_2$ in the same delay line $D_4$, as the bistable unit $B_5$ was triggered, when the pulse counting chain $C_2$ was put in the position 1. The pulse in the delay line $D_4$ circulates eight cycles and after each cycle the chain $C_2$ advances one step. When the chain $C_2$ has reached the end position, the bistable units $B_4$ and $B_5$ are re-set in resting position.

The position 1 in the chain $C_2$ corresponds to the frame 1, and therefore (as evident from Fig. 3), the and-circuit $MG_1$ is open for the pulse from the translator, said pulse being sent on the same signal connection $S_1$ which is used for the transmission of information to the translator. The pulses on the wires 0, 1, 2, 4, 7 are received at the time intervals, respectively, which correspond to the five time positions within the frames.

The five first frames in the cycle 3 (Fig. 6c), during which the value of the digit which is to be sent and instructions if any are transmitted from the translator to the register, are distributed by the chain $C_2$ through the and-circuits $MG_1$ to $MG_5$ to the columns $M_1$ to $M_5$, respectively, of the bistable units. Within the respective coulmns the information pulses from the translator are distributed by means of pulses on the wires 0, 1, 4, 7, said pulses causing the and-circuits $MG_{10}$ to $MG_{17}$ within the column 1 to open in turn, as evident from Fig. 5.

In the positions 6, 7, 8 of the chain $C_2$ (Fig. 3) the and-circuit GV is open, and the translator can, therefore, in said positions which correspond to the frames 6, 7, 8, send the so called via-marking into the delay line $D_1$. The translator thereafter cuts off the connection by means of the translator selector. The translator can also cut off the connection earlier by means of the translator selector, if it for example does not have any item of information to transmit to the register.

I claim:
1. In an automatic telephone system an electronic register for receiving, recording and retransmitting data including digits dialled by a calling subscriber and required for establishing a connection, said system comprising at least one magnetostrictive delay line memory means including at least one transmitting coil at one end and at least one receiving coil at the other end for storing the data received, means for recirculating the data information in said line as a time division pulse code, the value of each datum being determined by how many and which of a number of possible time positions pulses, means for introducing said information into the delay line in a determined sequence, means for connecting a utilization circuit to the register, means for transferring the information stored in said delay line to said utilization circuit in the same pulse code as is used in the delay line, and a second delay line for storing synchronization pulses to control the reception of information and the transmission of information from said first delay line.

2. In an electronic register a first magnetostrictive delay line memory having input and output means located at opposite ends of the line for storing digital data, a second magnetostrictive delay line memory for storing pulses for synchronizing the position of the digital data on said first delay line memory, means for entering a control impulse in said second delay line for indicating the time position of the first and last received digit in the first delay line, means for sensing the time position of the control impulse in relation to said synchronizing pulses and for directing the next digit to be received to the time position after the last restored digit, means for shifting said last control impulse one time position equal to the time interval between successive digits on the first delay line, and means for generating a marking signal by means of said control impulse indicating the time position of the first digit when said first digit arrives at the output means of said first delay line.

3. An electronic register as claimed in claim 1, and comprising means for storing a phase pulse on one of said delay lines for indicating the progress of the operations of said register and means for shifting said phase pulse to the next pulse position when an operation is concluded.

4. An electronic register as claimed in claim 3, wherein the delay line is provided with at least one transmitter and at least one receiver coil spaced a certain distance, and comprising an additional coil which is connected when the phase pulse is to be displaced and so located that the distance between the transmitting and the receiving coils is increased by one pulse position.

References Cited in the file of this patent

UNITED STATES PATENTS

| | | |
|---|---|---|
| 2,666,809 | Flowers | Jan. 19, 1954 |
| 2,683,772 | Flowers | July 13, 1954 |
| 2,716,159 | Flowers | Aug. 23, 1955 |
| 2,727,094 | Flowers et al. | Dec. 13, 1955 |